United States Patent [19]

Croce

[11] Patent Number: 5,227,945
[45] Date of Patent: Jul. 13, 1993

[54] THERMIC PROTECTION DEVICE FOR VEHICLE LIGHTERS

[75] Inventor: Claudio Croce, Caselette, Italy
[73] Assignee: Imos Italia S.r.l., Turin, Italy
[21] Appl. No.: 720,936
[22] Filed: Jun. 25, 1991

[30] Foreign Application Priority Data

Dec. 21, 1990 [IT] Italy .................. 68033 A/90

[51] Int. Cl.⁵ .................. H01H 37/52; F23Q 7/26
[52] U.S. Cl. ........................ 361/105; 219/265
[58] Field of Search .............. 361/54, 103, 104, 105, 361/106; 219/263, 264, 265, 260, 262, 261; 337/348, 103

[56] References Cited

U.S. PATENT DOCUMENTS

| | | | |
|---|---|---|---|
| 3,532,849 | 10/1970 | Horwitt | 219/265 |
| 3,662,153 | 5/1972 | Barnes, Jr. et al. | 219/265 |
| 3,863,047 | 1/1975 | Mase | 219/265 |
| 4,016,400 | 4/1977 | Seibel et al. | 219/264 |
| 4,459,464 | 7/1984 | Oda et al. | 219/264 |
| 5,116,233 | 5/1992 | Croce | 439/161 |

FOREIGN PATENT DOCUMENTS

| | | |
|---|---|---|
| 0436865 | 7/1991 | European Pat. Off. |
| 3018222 | of 0000 | Fed. Rep. of Germany |
| 3237995 | of 0000 | Fed. Rep. of Germany |
| 3240716 | of 0000 | Fed. Rep. of Germany |
| 2272343 | of 0000 | France |

*Primary Examiner*—A. D. Pellinen
*Assistant Examiner*—Ronald William Leja
*Attorney, Agent, or Firm*—Merchant & Gould, Smith, Edell, Welter & Schmidt

[57] ABSTRACT

A thermic protection device for vehicle lighters in which the electric contact holder base (16) is provided with a first bimetallic lamina (15) for thermic protection against superheating that causes a short circuit allowing the lighter to be reutilized.

The base (16) is fitted with a second bimetallic lamina (18) for thermic protection that remains abut against the resistor (12) of the lighter's plug (10) when this is pressed into the base, maintaining the electric contact until at least the first lamina (15) is started up.

3 Claims, 3 Drawing Sheets

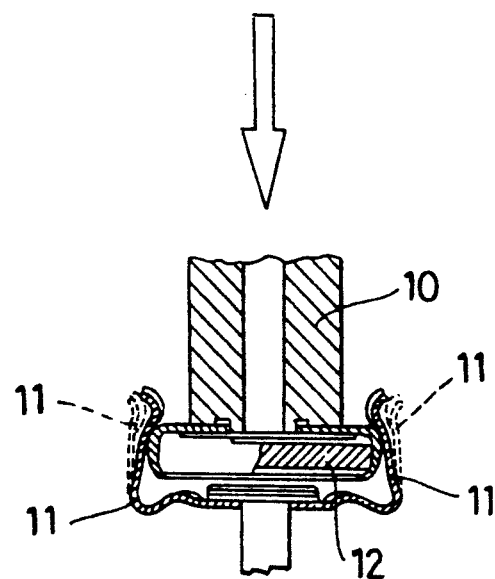
*Prior Art* Fig.1
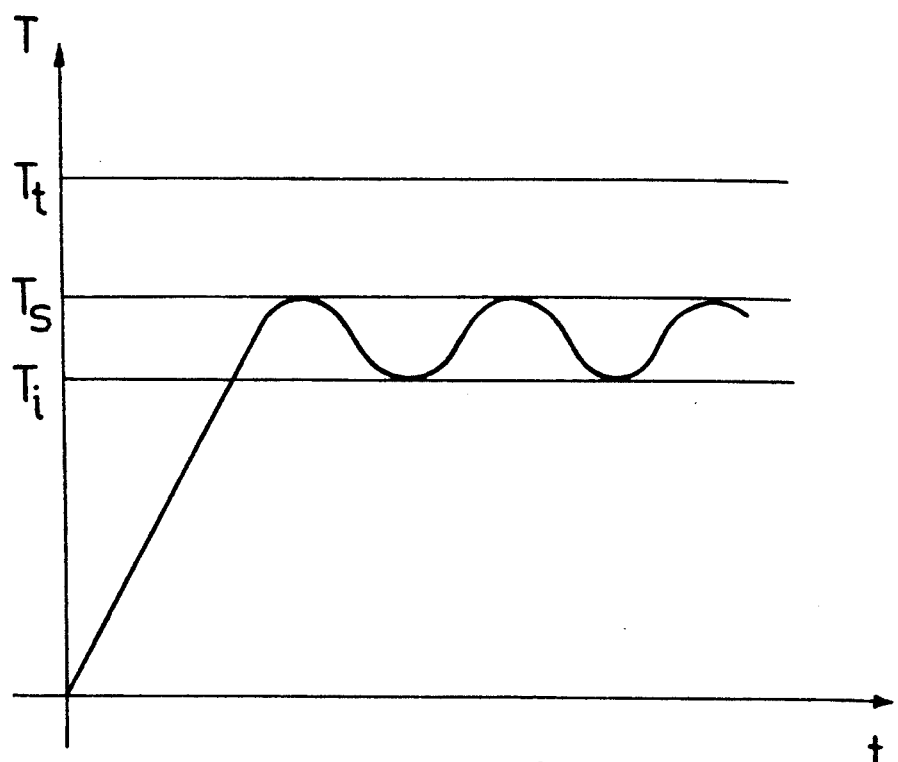
*Prior Art* Fig.2

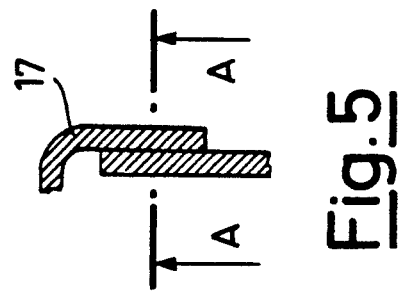
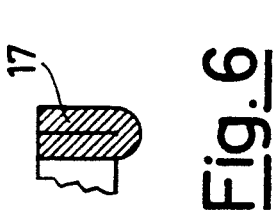
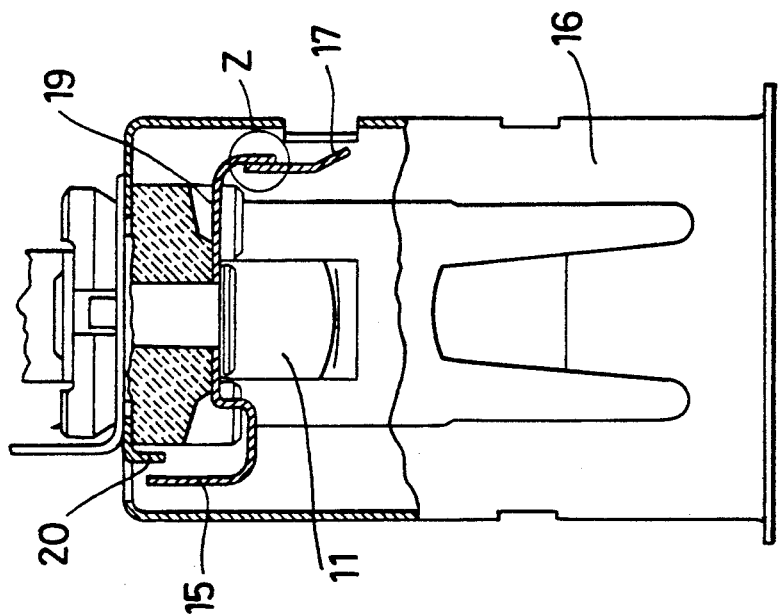
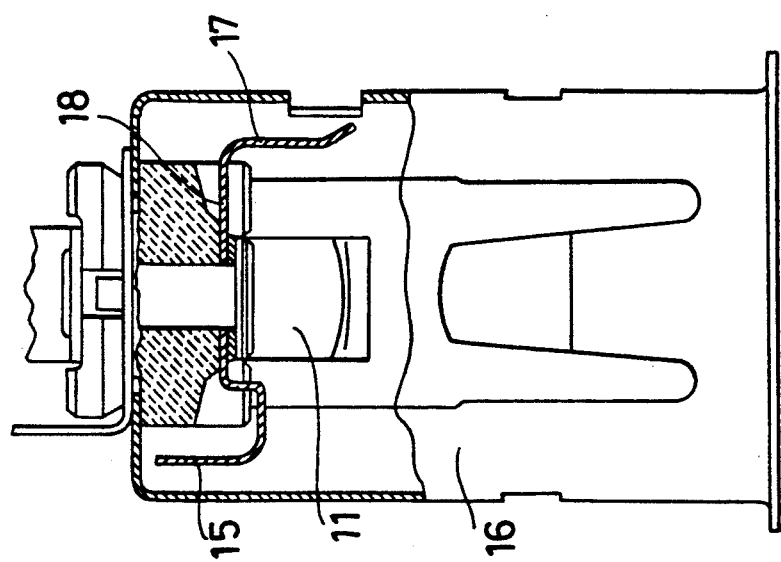

THERMIC PROTECTION DEVICE FOR VEHICLE LIGHTERS

This invention refers to a thermic protection device for vehicle lighters.

The electric contact-holder bases for lighters and other gadgets mounted on vehicles are at present fitted with a thermic protection against superheating, so they can be re-utilized also when they are misshapen or faulty.

During the design of these bases, electric wear of the unit is taken into account as the main cause of bad operation.

This drawback occurs when the bimetallic spring is kept blocked up against the hot-plate resistor of the plug, so that the plug that is inserted and pushed inside the base but cannot be expelled.

During this stage a quick and excessive superheating of the concerned part occurs due to the persisting power supply, as the bimetallic spring does not break loose from the plug's resistor.

The sudden and continuous temperature increase causes the thermic protection to work in quite a short time, so the lighter is safe in any case.

A second bad operation cause that the designer should consider is the possibility of the plug getting mechanically blocked inside the base.

This drawback occurs when an external object keeps the plug pressed up inside the base, stopping it from being expelled.

In this case the hot-plate of the plug resistor remains positioned in the zone of the electric contact, but allowing the bimetallic spring to moves (oscillates) according to the temperature that decreases when the bimetal widens up and disconnects the resistor from the power supply.

In this way it happens that the temperature of the concerned zone rises at first and then oscillates within a range that is below the level that actuates the thermic protection.

This is due to the continuous cyclic behaviour of the bimetallic spring. This condition evidently renders the product not reliable as the lighter can be power supplied for too long.

The purpose of this invention is to disclose an additional thermic protection device preventing the above mentioned drawback from occurring. The device must guarantee the continuity of the electric contact on the resistor of the plug even if the bimetallic spring should widen because of the high temperature until it loses the contact with the hot plate.

This should let the temperature of the concerned zone raise until the thermic protection is actuated, short-circuiting the unit definitely.

For this and other purposes that will appear more clearly with further description, this invention proposes to realize a thermic protection device for vehicle lighters in which the electric contact holder base is provided with a first bimetallic lamina for thermic protection against superheating that causes a short circuit allowing the lighter to be reutilized, characterized in that the base is fitted with a second bimetallic lamina for thermic protection that remains abut against the resistor of the lighter's plug when this is pressed into the base, maintaining the electric contact until at least the first lamina is started up.

The device according to the invention will now be described with reference to the enclosed drawings, in which:

FIG. 1 is an axial partial section of a traditional lighter in the above indicated bad operating conditions that this invention proposes to avoid;

FIG. 2 is a diagram that represents the said bad operating conditions;

FIGS. 3 and 4 are two different embodiments of the device according to this invention mounted inside an electric contact base holder for vehicles;

FIG. 5 is a larger view of the embodiment of FIG. 4;

FIG. 6 is a cross section corresponding to line 6—6 of FIG. 5.

Figure 7:
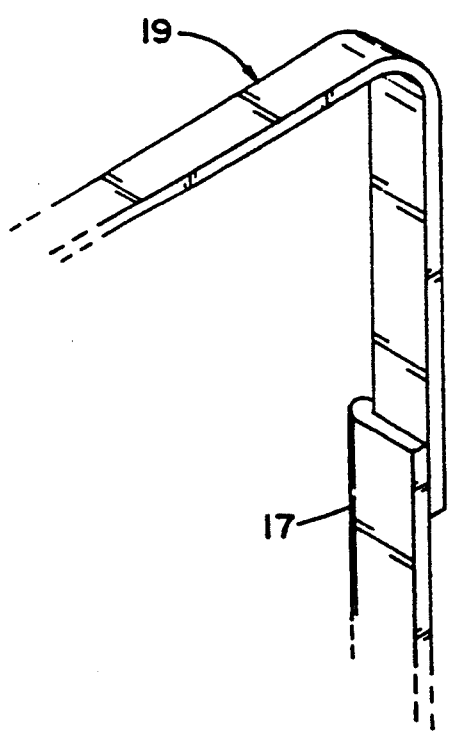
FIG. 7 is a larger perspective view of the embodiment of FIG. 4 and FIG. 5.

Referring to FIGS. 1 and 2 the above mentioned drawback can be understood clearly.

When the plug 10 is kept pressed inside the base by an external force A, the power supplied resistor 12 overheats until it gets the bimetallic spring 11 to widen. In normal conditions this would let the plug 10 return automatically in its resting position.

On the other hand if the plug 10 is pressed by an external object but the power is not supplied because the springs 11 are not in contact with the resistor 12 any more, the springs 11 will quickly contact the resistor 12 again in an elastic mode. In this way the electric contact is re-established and a new temperature rise will follow.

This cycle is represented in the diagram of FIG. 2, where it can be observed that the temperature T of the concerned area oscillates in time t between a minimum value T.i. (bimetallic springs 11 detached from the resistor 12) and T.s. (bimetallic springs 11 contacting resistor 12).

In no case the temperature of the hot-plate zone will reach value T.t. at which the traditional thermic protection is started up, disconnecting the electric circuit of the lighter when said safety temperature of the unit is reached.

To obviate such drawback the invention proposes to add a second bimetallic lamina to the bimetallic lamina 15 (FIGS. 3 and 4). This second lamina acts as a thermic protection, should the plug 10 ever get stuck up inside the base 16.

Two different solutions can be realized, both attaining the same aim and using the same innovating idea.

The first embodiment is shown in FIG. 3 and it refers to a solution that was proposed by the same Applicant in Utility Model Application No. 52812-B/90 filed on Jan. 12, 1990.

This application proposed to realize a bimetallic spring 11 for holding the plug 10 and a bimetallic lamina 18 in two different materials so as to deflect at different temperatures. The bimetallic lamina 18 act as a thermic protection and has an appendix 15 extending from it.

So in this case it is enough to extend the bimetallic lamina 18 with a further appendix 17 (FIG. 3) that will be constantly contacting the resistor 12 of the plug 10 when this is pressed against the base 16.

In this way, both the appendix 15 of the bimetallic lamina 18, that is the main thermic protection, and the further appendix 17 proposed by this invention bend towards the wall of the base 16 at a temperature that is higher than temperature T.s. reported in the diagram of FIG. 2. The appendix 17 will be continuously in contact with the resistor 12 during the continuous closing or opening oscillations of the bimetallic spring 11. In this way the appendix 17 keeps the electric circuit closed and causes the temperature to rise up to temperature T.t. (FIG. 2) at which the thermic protection is started up.

The other appendix 15 will deflect and touch the wall of the base 16 interrupting the electric circuit definitively.

With traditional thermic protection (FIG. 3), the laminas 15 and 18 are obtained from the same bimetallic strip. According to other forms of realization, the thermic protection laminas 15 and 19 (FIG. 4) are obtained from two separate bimetallic strips (FIG. 4).

In this case it is necessary to fold the lamina 19 (see FIGS. 5 and 6) to guarantee continuous contact between appendix 17 and resistor 12 of plug 10.

Otherwise the temperature rise would cause this extremity of the lamina to deflect like appendix 15, which bends against the tooth 20 of the base 10 rather than towards the wall of this as in the case of the independent lamina of FIG. 3.

It is evident that the two embodiments of the appendix 17 shown in FIGS. 3 and 4 are given by way of example as they refer to two different forms that are actually used in the bodies of lighters. FIG. 7 further shows the area of contact between appendix 17 and lamina 19 of the embodiment shown in FIGS. 4 and 5.

As a matter of fact, the appendix 17 that is the object of the present invention can also be realized differently and can be independent both from the main thermic protection 15 and the spring 11 that restrains the plug. That is it can be a completely separate member, within the purposes and the advantages of the invention as protected by the following claims.

I claim:

1. A thermic protection device for vehicle lighters in which an electric contact holder base (16) is provided with a contact spring (11) and a first bimetallic lamina (15) for thermic protection against superheating that causes a short circuit allowing a lighter to be reutilized, characterized in that a base (16) is fitted with a second bimetallic lamina (18) for thermic protection that remains abut against a resistor (12) of the lighter's plug (10) when the plug (10) is pressed into the base, maintaining the electric contact of the resistor (12) until at least the first lamina (15) deflects in response to heating.

2. A device according to claim 1, characterized in that the two thermic protection laminas (15, 18) are obtained from the same bimetallic strip.

3. A device according to claim 1, characterized in that the two thermic protection laminas (15, 19) are obtained from two separate bimetallic strips.

* * * * *